United States Patent [19]
Maru et al.

[11] Patent Number: 5,781,963
[45] Date of Patent: Jul. 21, 1998

[54] COEXTRUDED SCREWDRIVER HANDLE AND METHOD OF MAKING SAME

[75] Inventors: Joseph P. Maru, North Branford; Clifford H. Snow, Jr., Southington, both of Conn.; Toye F. Howle, Darlington, S.C.

[73] Assignee: The Stanley Works, New Britain, Conn.

[21] Appl. No.: 540,588

[22] Filed: Oct. 6, 1995

[51] Int. Cl.⁶ ..................................... B25G 1/10
[52] U.S. Cl. ..................... 16/111 R; 16/DIG. 18; 16/DIG. 19; 264/173.16; 81/177.1
[58] Field of Search ............... 16/110 R, 111 R, 16/114 R, DIG. 12, DIG. 18, DIG. 19; 264/173.16; 81/177.1, 489, 492; 15/143.1, 167.1

[56] References Cited

U.S. PATENT DOCUMENTS

| 2,808,088 | 10/1957 | Whiteford | 81/492 |
|---|---|---|---|
| 4,211,741 | 7/1980 | Ostoich. | |
| 4,405,547 | 9/1983 | Koch et al. | 264/173.16 |
| 4,739,536 | 4/1988 | Bandera et al. | 16/111 R |
| 5,112,548 | 5/1992 | Roberts et al. | |
| 5,137,675 | 8/1992 | Rabe. | |
| 5,145,082 | 9/1992 | Craft, Jr. et al. | 16/111 R |
| 5,261,665 | 11/1993 | Downey | 16/DIG. 12 |
| 5,339,482 | 8/1994 | Desimone et al. | 15/167.1 |
| 5,362,435 | 11/1994 | Volpe. | |
| 5,365,650 | 11/1994 | Smith et al. | 72/254 |
| 5,390,572 | 2/1995 | Gakhar et al. | 16/111 R |
| 5,475,894 | 12/1995 | Wildforster | 16/DIG. 12 |
| 5,530,989 | 7/1996 | Remmert et al. | 16/DIG. 12 |

FOREIGN PATENT DOCUMENTS

| 0062270 | 10/1982 | European Pat. Off. | 81/177.1 |
|---|---|---|---|
| 2635998 | 3/1990 | France | 81/489 |
| 2452302 | 12/1979 | Germany | 81/177.1 |

*Primary Examiner*—Chuck Mah
*Assistant Examiner*—Donald M. Gurley
*Attorney, Agent, or Firm*—Pepe & Hazard LLP

[57] ABSTRACT

Rotatable hand tools such as screwdrivers utilize a coextruded tool handle which provides a comfortably grip. The handle has an extruded body formed of a rigid synthetic resin with a uniform cross section over most of the length of its grip portion. Extending axially over the length of the grip portion is a multiplicity of coextruded peripherally spaced stripes of a synthetic resin which is substantially softer than that of the body, and these stripes are firmly bonded to the body.

24 Claims, 2 Drawing Sheets

COEXTRUDED SCREWDRIVER HANDLE AND METHOD OF MAKING SAME

BACKGROUND OF THE INVENTION

The present invention relates to tools, and more particularly, to hand tools having elongated handles with hand grip portions.

Screwdrivers and like tools which are manipulated by a user for a considerable time and/or which require the transfer of substantial forces between the user's hand and the tool tend to produce irritation of the user's hand due to the force exerted on the tool and the tendency for the tool to slip if not held tightly. Moreover, smooth plastic handles may slip in the user's hand if they do not have cross sectional contours providing a non-circular configuration resisting rotation within the user's grip.

As a result, there have been a number of efforts to provide slip resistant coatings on the gripping portions of handles and/or to provide layers of softer resin in the gripping area to provide a softer feel to the handle. Illustrative of such structures is Bandera et al U.S. Pat. No. 4,739,536 granted Apr. 26, 1988 in which a dual durometer handle is provided by molding a softer material into recesses formed in a rigid body or by adhering preformed soft elements in such recesses. Such handle structures provide the advantage of providing greater comfort to the user albeit at substantially higher costs and with limitations as to the rate of manufacture.

It is an object of the present invention to provide a novel tool utilizing a dual durometer handle which may be fabricated by a coextrusion process.

It is also an object to provide such a tool handle which may be fabricated readily and economically and which is readily adapted to variations in cross section by merely or substituting different extrusion dies.

Still another object is to provide a novel method for forming such tool handles by a coextrusion process.

SUMMARY OF THE INVENTION

It has now been found that the foregoing and related objects may be readily attained in a comfortably gripped tool handle adapted to seat the shank of a tool element for its rotation. The handle is elongated with a tool receiving end portion and a grip portion extending to its other end, and it has an extruded body formed of a rigid synthetic resin and having a uniform cross section over most of the length of the grip portion. Axially extending over the grip portion is a multiplicity of coextruded peripherally spaced stripes of a synthetic resin which is substantially softer than that of the body, and these stripes are firmly bonded to the body.

In the final tool, the shank of a tool such as a screwdriver blade is driven into an axial recess formed in the tool receiving end portion.

In one embodiment, the cross section of the grip portion of the body is non-circular, and it provides a multiplicity of axially extending edge portions over which the stripes extend. The cross section of the body is generally polygonal with the corners of the polygon providing the edge portions, and these edge portions are rounded corners. Preferably, the polygon is a square.

In another embodiment the cross section of the grip portion is circular and a multiplicity of circumferentially spaced axially spaced stripes extend along its length.

In the preferred embodiment, the resin of the body is a cellulose acetate butyrate or cellulose acetate propionate and the resin of the stripes is a polyurethane. For optimum properties, the stripes comprise a base layer which is firmly bonded to the body and an outer layer having the desired properties of softness and durability. In the preferred embodiment, both of the layers are polyurethane resin.

The a method of making the tool handle for the rotatable tool includes the steps of coextruding a relatively rigid resin to form a body of uniform cross section and a relatively soft synthetic resin to form about the body, a plurality of peripherally spaced and axially extending stripes. In the coextrusion process, the stripes are firmly bonded to the body to provide a dual durometer composite rod of uniform cross section along its length.

This composite rod is severed at spaced points along its length to provide handle blanks, and an axially extending recess adapted to receive the shank of the tool is formed in one end of the handle blanks. Generally, the method includes a step of machining the handle blanks to provide a collar at the one end and a portion of reduced cross section adjacent thereto, with the remainder of the handle blank providing the handle grip portion. This machining step removes the stripes over the collar and reduced portion and retains the stripes as peripherally spaced, axially extending stripes in the grip portion. Preferably, the other end of the handle blank is machined to provide a convex surface.

Generally, the extruding step utilizes at least two extruders, one of which provides a molten stream of relatively rigid resin and a second (and third) extruder which provides a molten stream of the softer resin. These streams are fed into a die block having a die orifice at spaced points from the die orifice to provide the body and then the stripes.

DETAILED DESCRIPTION OF THE PREFERRED EMBODIMENT

Figure 1:
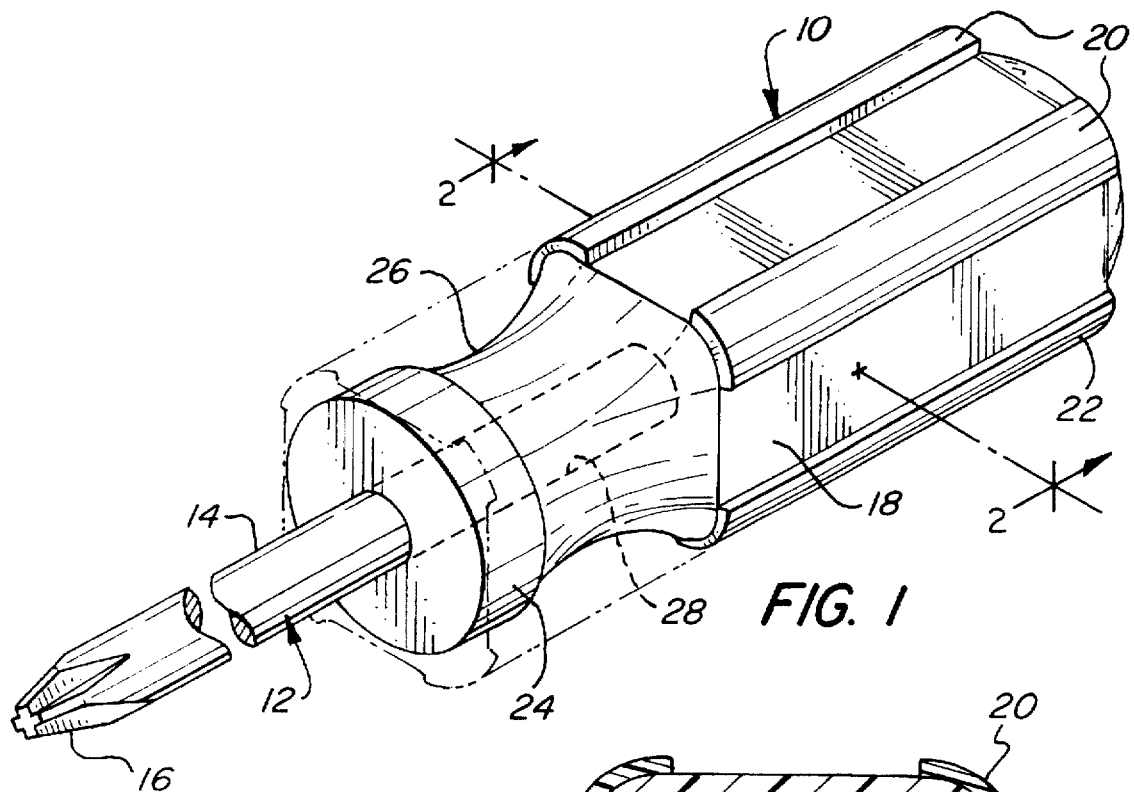
FIG. 1 is a fragmentary perspective view of a screwdriver embodying the present invention.

Turning first to FIG. 1, therein illustrated is a screwdriver embodying the present invention which is comprised of a handle generally designated by the numeral 10 and a screwdriver blade generally designated by the numeral 12 having an elongated shank 14 with a Phillips head tip 16.

The screwdriver handle 10 has an elongated body of 18 of a relatively rigid synthetic resin, a collar 24 at the end which receives the shank 14 of the tool 12 and a recessed portion 26 adjacent the collar. The remainder of the handle 10 provides the grip portion 22 upon which there are a series of stripes 20 of a relatively soft resin as will be described more fully hereinafter. As indicated by the dotted line showing in FIG. 1, there is a recess 28 in the end of the handle 10 in which is seated the shank 14 of the blade 12.

Figure 4:
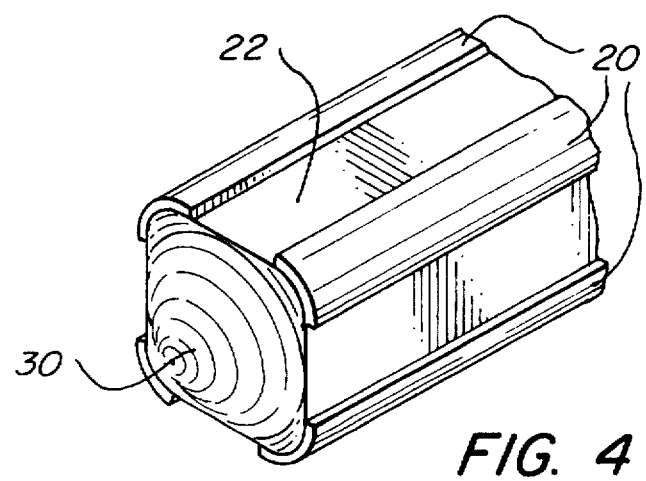
FIG. 4 is a fragmentary perspective view of the grip end of the handle of FIG. 1.

As seen in FIG. 4, the opposite end 30 is machined to provide a convex surface.

Figure 2:
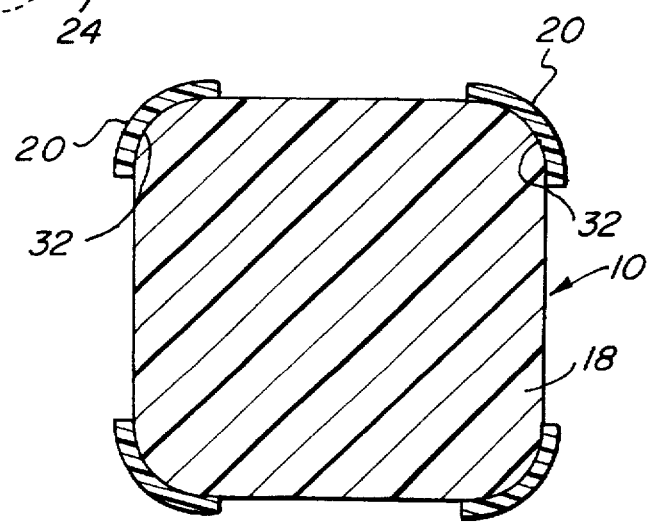
FIG. 2 is a cross sectional view thereof along the section line 2—2 of FIG. 1.
Figure 3:
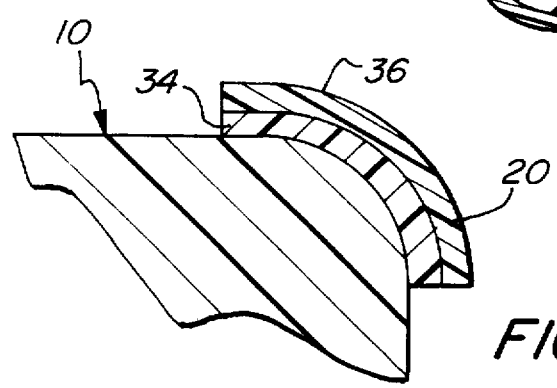
FIG. 3 is an enlarged portion of the sectional view of FIG. 2.

Turning next to FIGS. 2 and 3, the body 18 of the handle is of generally uniform cross section throughout the length of the grip portion 22 to the convex end 30, and that cross section is generally polygonal or square with rounded corners 32. The stripes 20 extend from the end of the recess 26 and over the length of the grip portion and about the rounded corners 32 to the convex end 30.

As seen in FIG. 3, the preferred structures of the present invention employ stripes having a base layer 34 which is formed of a composition which bonds strongly to the underlying body, and an outer layer 36 of a similar polymeric composition but having physical properties which provide the desired softness and wear resistance.

Figure 5:
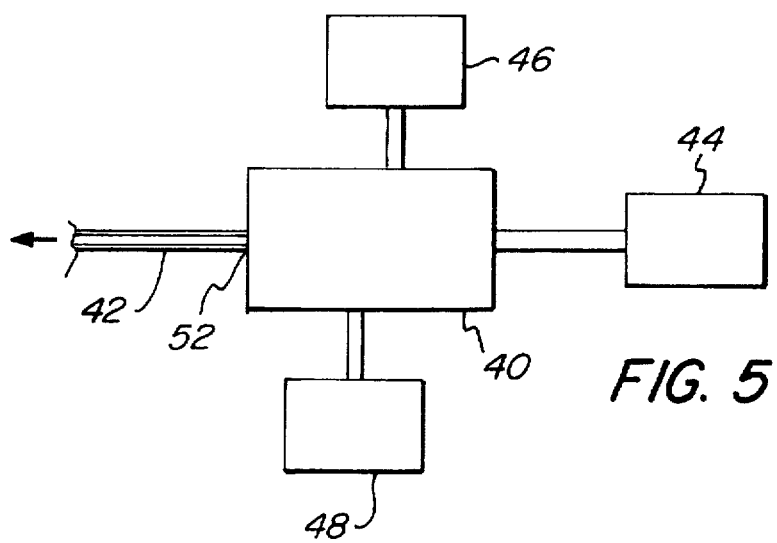
FIG. 5 is a schematic illustration of the coextrusion apparatus utilized to produce the dual durometer composite rod used in the tools of the present invention.
Figure 6:
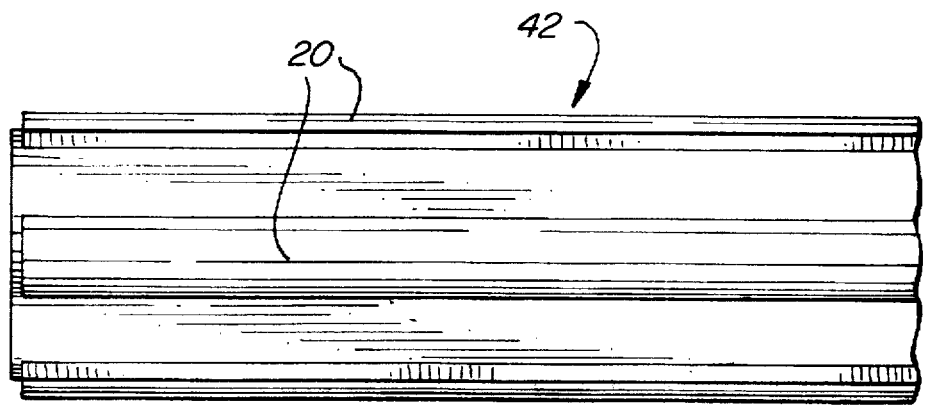
FIG. 6 is a side elevational view of the composite rod produced by the apparatus of FIG. 5.

Turning next to FIG. 5, the method of making the handle of the present invention involves a coextrusion process in which there is provide a die block 40 with an orifice 52 at one end thereof through which is extruded the composite rod 42. The body of the rod 42 is provided by a molten stream of resin from the extruder 44 which is introduced into the die block at a point spaced furthest from the orifice 52. At points spaced along the path to the orifice 52, molten streams of resin from the extruders 46 and 48 are successfully deposited on portions of the body to provide the stripes 20 of the softer resin along the corners of the body 18 of the rod 42. As is conventional, the die 40 has manifold chambers spaced along its length to receive the streams of molten resin from the extruders 46 and 48 so as to deposit the molten material in four stripes upon the body. The passage through the die 40 is initially of the configuration of the underlying body and thereafter provides the clearance at its corners for the deposition of the stripes on the partially solidified body.

Following the coextrusion of the composite rod, it is severed into lengths which are then placed in a machining center which machines the rounded end 30, the collar 24 and recessed portion 26. At a subsequent work station, the recess 28 is drilled into the end of the handle blank. The handle blank is then transferred to another station where the shank of the tool 14 is driven into the recess 28 to complete the assembly of the tool.

Following the machining of the recess, collar and end portion of the handle blank, it is desirable to polish the surfaces which have been machined.

From the standpoint of ease of extrusion and fabrication and from the standpoint of economy in requiring a relatively thin layer of the softer resin, the generally square cross section of the illustrated embodiment has proven highly advantageous. If so desired, the die may be altered to provide recesses between the stripes thus reducing the cost of the resin for the body. The cross sectional shape may be changed to hexagonal, triangular or other as desired. A significant advantage to the coextrusion process is that the extrusion die required for practice of the present invention is of relatively low cost as compared to injection molding and other process. By using the technique of coextrusion to provide the softer resin in only the edge portions of the cross section of the grip, minimization of the amount of the more expensive polymer required for the softer but wear resistant stripes is possible.

From the standpoint of the resins for use in making the coextruded handles, the preferred combination is a cellulose acetate/butyrate resin for the body of the handle and a polyurethane system for the stripes. Although polyurethane systems may be utilized which bond readily to the cellulose acetate/butyrate resin body, the preferred resin compositions from the standpoint of feel do not bond so readily. Therefore, the preferred system of the present invention utilizes a combination of a first urethane composition which bonds readily to the cellulose acetate/butyrate and a second urethane resin composition which is placed thereon and which bonds readily to the first polyurethane composition and provides the desirable softness and resistance to abrasion.

Cellulose acetate/propionate may be substituted for the cellulose acetate/butyrate. Alternative resin systems include a relatively rigid polyvinyl chloride composition for the body member and a highly plasticized, soft polyvinyl chloride polymer for the stripes. Another system which can be employed is rigid polypropylene for the handle body and a rubber modified polypropylene (TPO) for the stripes.

Generally, the resin systems should provide a body with a durometer of 30–60 on the R scale and stripes with a durometer of 60–80 on the A scale. The stripes should have a thickness of about 0.015–0.045 inch to provide the desired feel, but could be thicker.

Although the present invention has been described and illustrated with respect to a handle for a screwdriver, it should be appreciated that it also can be utilized on other elongated handles which are gripped by the hand such as chisels, trowels and scrappers.

Exemplary of the method of the present invention is the following specific example.

Into an extrusion die of the type schematically illustrated in FIG. 4 of the attached drawings is introduced a cellulose acetate/butyrate polymer sold by Eastman Plastics under the designation TENITE. Introduced at two spaced points along the length of the path to the die orifice are introduced two molten streams of thermoplastic polyurethane elastomers sold by Dow Plastics under the trademark PELLETHANE. The first composition is more rigid but adheres well to the underlying cellulose acetate/butyrate substrate and the second is a more flexible and softer polyurethane which adheres firmly to the first polyurethane layer.

The die is maintained at a temperature of 340°–380° Fahrenheit and the extruded rod is pulled from the extrusion die. The rod is rapidly cooled and then cut into sections as heretofore described. Machining of the handle blanks is also as heretofore described.

The thickness of the bottom layer of polyurethane is 0.015 inch and the thickness of the outer layer of the polyurethane is 0.020 inch for a total thickness of the stripe of 0.035 inch. The resin employed for the body of the handle has a durometer value of 40 on the R scale and the resin for the outer layer of the stripe has a durometer value of 70 on the A scale.

The handles produced by this method are found to be highly comfortable, and easily gripped by the user, and relatively resistant to slippage in the user's hand and to minimize any abrasive action upon the user's hand.

Thus, it can be seen from the foregoing detailed description and the attached drawings that the method of the present invention provides a novel and highly advantageous dual durometer handle for tools which may be readily gripped. The handle may be manufactured relatively economically and rapidly, and it may have varying cross sectional configurations. Moreover, the handle is quite attractive since the stripes provide a method for differential coloration along the length of the handle.

Having thus described the invention, what is claimed is:

1. A comfortably gripped tool handle adapted to seat the shank of a tool element for manipulation thereof, said handle being elongated with a tool receiving end portion and a grip portion extending to its other end, said handle having an extruded body formed of a rigid synthetic resin and having a uniform cross section over most of the length of said grip portion, said grip portion having a multiplicity of coextruded peripherally spaced external stripes extending axially over substantially the entire length of said grip portion and comprising a base layer of a synthetic resin which is firmly bonded to said body and an outer layer of synthetic resin which is substantially softer than that of said body and firmly bonded to said base layer, said stripes thereby being firmly bonded to said body.

2. The tool handle of claim 1 wherein said cross section of said grip portion of said body is non-circular and provides a multiplicity of axially extending edge portions, said stripes extending along and about said edge portions.

3. The tool handle of claim 2 wherein said cross section of said body is generally polygonal with the corners of the polygon providing said edge portions.

4. The tool handle of claim 3 wherein said edges of said polygon are rounded corners.

5. The tool handle of claim 4 wherein said polygon is a square.

6. The handle of claim 1 wherein said resin of said body is a cellulose acetate/butyrate and said resin of said stripes is a polyurethane.

7. The tool handle of claim 1 wherein both of said layers are polyurethane resins.

8. A comfortably gripped tool, comprising:
(a) an elongated handle being with a tool receiving end portion and a grip portion extending to its other end, said handle having an extruded body formed of a rigid synthetic resin and having a uniform cross section over most of the length of said grip portion, said grip portion having a multiplicity of coextruded peripherally spaced external stripes extending axially over substantially the entire length of said grip portion and comprising a base layer of a synthetic resin which is firmly bonded to said body and an outer layer of a synthetic resin which is substantially softer than that of said body and firmly bonded to said base layer, said stripes thereby being firmly bonded to said body, said tool receiving end portion having an axially extending recess in the end thereof; and
(b) a tool having a shank seated in said recess of said handle.

9. The tool in accordance with claim 8 wherein said cross section of said grip portion of said body is non-circular and provides a multiplicity of axially extending edge portions, said stripes extending along and about said edge portions.

10. The tool in accordance with claim 9 wherein said grip portion is generally polygonal with the corners of the polygon providing said edge portions.

11. The tool in accordance with claim 10 wherein said polygon has rounded corners.

12. The tool in accordance with claim 8 wherein said resin of said body is a cellulose acetate/butyrate and said resin of said stripes is a polyurethane.

13. The tool in accordance with claim 12 wherein said stripes comprise a base layer which is firmly bonded to said body and an outer layer.

14. In a method for making a comfortably gripped tool handle for a rotatable tool, the steps comprising:
(a) coextruding a relatively rigid resin to form a body of uniform cross section and a plurality of peripherally spaced and axially extending stripes of a relatively soft synthetic resin on said body, said stripes being firmly bonded to said body to provide a dual durometer composite rod of uniform cross section along its length;
(b) severing said composite rod at spaced points along its length to provide handle blanks; and
(c) forming in one end of said handle blanks an axially extending recess adapted to receive the shank of a tool.

15. The method of making a tool handle in accordance with claim 14 including the step of machining said handle blanks to provide a collar at said one end and a portion of reduced cross section adjacent thereto, the remainder of said handle blank providing a handle grip portion.

16. The method of making a tool handle in accordance with claim 15 wherein said machining step removes said stripes over said collar and reduced portion and retains said stripes as peripherally spaced, axially extending stripes in said grip portion.

17. The method of making a tool handle in accordance with claim 14 wherein the other end of said handle blank is machined to provide a convex surface.

18. The method of making a tool handle in accordance with claim 14 wherein said stripes are a composite of an inner layer of a first synthetic resin composition bonded securely to said body and an outer layer of a second resin which is of similar composition.

19. The method of making a tool handle in accordance with claim 18 wherein said synthetic resin of said layers of said stripes is polyurethane.

20. The method of making a tool handle in accordance with claim 14 wherein said extruding step utilizes at least two extruders, one of which provides a molten stream of relatively rigid resin and a second which provides a molten stream of said softer resin, and wherein said streams are fed into a die block having a die orifice, said streams being fed into said die block at points spaced from said die orifice to provide first said body and then form said stripes thereon.

21. A comfortably gripped tool handle adapted to seat the shank of a tool element for manipulation thereof, said handle being elongated with a tool receiving end portion and a grip portion extending to its other end, said handle having an extruded body formed of a rigid synthetic resin and having a uniform cross section over most of the length of said grip portion, said grip portion having a multiplicity of coextruded axially extending, peripherally spaced stripes of a synthetic resin which is substantially softer than that of said body, said stripes being firmly bonded to said body, said resin of said body being a cellulose acetate/butyrate and said resin of said stripes being a polyurethane.

22. A comfortably gripped tool handle adapted to seat the shank of a tool element for manipulation thereof, said handle being elongated with a tool receiving end portion and a grip portion extending to its other end, said handle having an extruded body formed of a rigid synthetic resin and having a uniform cross section over most of the length of said grip portion, said grip portion having a multiplicity of coextruded axially extending, peripherally spaced stripes of a synthetic resin which is substantially softer than that of said body, said stripes being firmly bonded to said body, said stripes comprising a base layer which is firmly bonded to said body and an outer layer firmly bonded to said base layer, the resin of both of said layers being polyurethane resins.

23. A comfortably gripped tool, comprising:
(a) an elongated handle being with a tool receiving end portion and a grip portion extending to its other end, said handle having an extruded body formed of a rigid synthetic resin and having a uniform cross section over most of the length of said grip portion, said grip portion having a multiplicity of coextruded axially extending, peripherally spaced stripes of a synthetic resin which is substantially softer than that of said body said stripes being firmly bonded to said body, said tool receiving end portion having an axially extending recess in the end thereof, said resin of said body being a cellulose acetate/butyrate and said resin of said stripes being a polyurethane; and
(b) a tool having a shank seated in said recess of said handle.

24. The tool in accordance with claim 23 wherein said polyurethane stripes comprise a base layer which is firmly bonded to said body and an outer layer firmly bonded to said base layer.

* * * * *